UNITED STATES PATENT OFFICE.

GEORG EGLY, OF TREPTOW, NEAR BERLIN, GERMANY, ASSIGNOR TO GEBRUEDER SIEMENS & CO., OF LICHTENBERG, NEAR BERLIN, GERMANY.

FIREPROOF ELECTRICALLY-CONDUCTING BODIES AND PROCESS OF MANUFACTURING THE SAME.

1,084,199.   Specification of Letters Patent.   Patented Jan. 13, 1914.

No Drawing.   Application filed September 12, 1910. Serial No. 581,614.

*To all whom it may concern:*

Be it known that I, GEORG EGLY, a subject of the German Emperor, and residing at Treptow, near Berlin, Germany, have invented certain new and useful Improved Fireproof Electrically-Conducting Bodies and Process of Manufacturing Same, of which the following is a specification.

My invention relates to an improved process for manufacturing fireproof, electrically-conducting bodies.

According to my invention fireproof bodies which are electrically conductive at normal atmospheric temperatures are produced by forming a mass of silicon and by heating it in surroundings from which it can take carbon and oxygen. Preferably the silicon is mixed with another fireproof substance such as silicon carbid and clay and formed into shape with this substance, for which purpose the mass may be rendered plastic either through a carbonizing binding medium such as resin or through a volatile binding medium such as paraffin.

In manufacturing the material the process may be carried out for instance by forming finely pulverized silicon and silicon carbid into shape through pressure and by heating this mixture in a carbon oxid environment (preferably to white heat temperature) whereby a solid homogeneous mass is produced, the admixtures of which are chemically bound. Generally a compound of SiCO is formed which is extremely hard and strong and has good conductivity. It is, however, possible that aside from, or instead of the compound SiCO similar compounds of silicon, carbon and oxygen are formed. Still the analysis up to the present has always indicated a compound approximately equivalent to the formula SiCO.

The finished product after assimilating carbon and oxygen has properties which are in many respects similar to those of the material known in the art which is composed of carbon, silicon and nitrogen, and which is produced by heating silicon in a nitrogen environment in the presence of carbon.

If in the present process coarsely granulated silicon is used instead of the fine powder, the effect may be obtained that the individual silicon particles form a chemical compound with carbon and oxygen only on the surface whereas the silicon in the interior remains unimpaired.

If carbonic acid is used instead of oxid of carbon, aside from the chemical compound of silicon, carbon and oxygen, a certain amount of silicic acid is formed which is entirely or partially volatilized in the strong heat and which in moderate heat remains in the mass.

Instead of using carbonic acid or carbon oxid alone, a mixture of both may be used in the present process. Small amounts of nitrogen are in this case not detrimental.

The bodies produced according to the present process may be used for instance as electrical conductors or resistance bodies or heating bodies and owing to their strength, hardness and their being fireproof, they may be also used for crucibles, grind-stones and similar objects.

I claim:

1. The process of producing fireproof electrically conductive bodies, which comprises fashioning a mass containing free silicon into the form of the body, and subsequently causing the fashioned body to absorb carbon and oxygen throughout the mass.

2. The process of producing fireproof electrically conductive bodies, which comprises fashioning a mass containing free silicon into the form of the body, and subsequently causing the fashioned body containing silicon to absorb carbon and oxygen by heating the same at suitable temperature in an environment capable of supplying carbon and oxygen thereto.

3. The process of producing fireproof electrically conductive bodies, which comprises fashioning a mass containing free silicon, and another fireproof material into the form of the body and subsequently causing the fashioned body to absorb carbon and oxygen by heating the same at suitable temperature in an environment capable of supplying carbon and oxygen thereto.

4. The process of producing fireproof electrically conductive bodies which comprises fashioning a mass containing silicon and silicon carbid into the form of the body and subsequently causing the fashioned body containing silicon and silicon carbid to absorb carbon and oxygen by heating the same at suitable temperature in an environment capable of supplying carbon and oxygen thereto.

5. The process of producing fireproof electrically conductive bodies which comprises fashioning a mass containing free silicon and a carbonizing binder into the form of the body and subsequently causing the fashioned body to absorb carbon and oxygen by heating the same at suitable temperature in an environment capable of supplying carbon and oxygen thereto.

6. The process of producing fireproof electrically conductive bodies which comprises fashioning a mass containing free silicon and another fireproof substance with a temporary binder into the form of the body and subsequently causing the fashioned body to absorb carbon and oxygen by heating it in an environment capable of supplying carbon and oxygen thereto.

7. The process of producing fireproof electrically conductive bodies which comprises fashioning a mass containing silicon and silicon carbid with a temporary binder into the form of the body and subsequently causing the fashioned body to absorb carbon and oxygen by heating the same at suitable temperature in an environment capable of supplying carbon and oxygen thereto.

8. The process of producing fireproof electrically conductive bodies, which comprises introducing carbon and oxygen into a fashioned body containing silicon under conditions suitable for the formation of a compound of the silicon carbon and oxygen thus brought into association.

9. A fireproof electrically conductive body bound together by a compound of silicon, carbon and oxygen, which is produced within the body.

10. A fireproof electrically conductive body containing silicon carbid and bound together with a compound of silicon, carbon and oxygen, which is produced within the body.

In testimony whereof, I have signed my name to this specification in the presence of two witnesses.

GEORG EGLY.

Witnesses:
WOLDEMAR HAUPT,
BRUNO BRUER.

---

Copies of this patent may be obtained for five cents each, by addressing the "Commissioner of Patents, Washington, D. C."